United States Patent [19]
Ikeda et al.

[11] Patent Number: 5,256,020
[45] Date of Patent: Oct. 26, 1993

[54] FASTENING MEMBER, FASTENING MACHINE ELEMENT SET, AND METHOD OF CONNECTING FASTENING MACHINE ELEMENT

[76] Inventors: Katsumi Ikeda; Katsuhiro Ikeda, both of 220-1 Motoichibasinden, Fuji, 417, Japan

[21] Appl. No.: 905,399

[22] Filed: Jun. 29, 1992

[30] Foreign Application Priority Data

Feb. 20, 1992 [JP] Japan ................ 4-033626
Apr. 1, 1992 [JP] Japan ................ 4-078099
Jun. 2, 1992 [JP] Japan ................ 4-140814

[51] Int. Cl.⁵ .............................. F16B 33/00
[52] U.S. Cl. ........................ 411/368; 411/371; 411/533
[58] Field of Search ............ 411/154, 368, 155, 156, 411/133, 533, 545, 247, 246, 437, 134, 371, 372, 531, 313, 314, 147, 160, 544

[56] References Cited

U.S. PATENT DOCUMENTS

| | | | |
|---|---|---|---|
| 307,671 | 11/1884 | McTighe | 411/247 |
| 1,445,111 | 2/1923 | Thomas | 411/247 |
| 2,102,229 | 12/1937 | Tinnerman | 411/437 |
| 2,235,233 | 3/1941 | McGrew | 411/147 |
| 3,298,270 | 1/1967 | Launay | 411/533 X |
| 3,892,021 | 7/1975 | Bisbing | 411/531 |
| 4,292,007 | 9/1981 | Wagner | 411/533 X |
| 4,907,923 | 3/1990 | McGrath, Jr. | 411/533 X |

FOREIGN PATENT DOCUMENTS 52-63547  5/1977  Japan .................. 411/11

*Primary Examiner*—Rodney M. Lindsey
*Attorney, Agent, or Firm*—Kanesaka and Takeuchi

[57] ABSTRACT

The present invention relates to a fastening member, a machine element set for fastening and a method of fastening the machine element for fastening so arranged that a through hole of a fastening member freely fastened to the shaft, the thread or the receiver portion of a thread member is formed into a narrow hole by warping, deforming, bending or twisting the fastening member so as to cause fastening edges to be fastened to the thread portion of the male thread member. When the male thread member is tightened, the narrow hole is restored to the original moderate through hole by the tightening force, so that the fastening member or members to be installed and held by the fastening member can be easily temporarily fixed. After the tightening work has been completed, the male thread member and the fastening member can be freely rotated with respect to each other, so that the damage of the corresponding element due to rubbing can be prevented.

11 Claims, 16 Drawing Sheets

FIG. 5 A
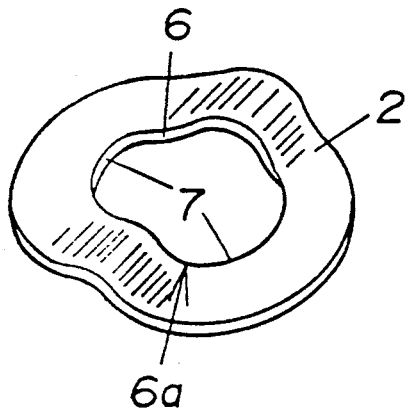
FIG. 5 B
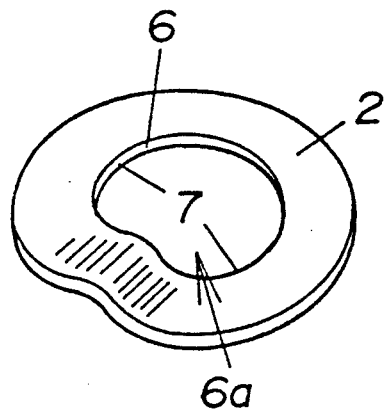
FIG. 5 C
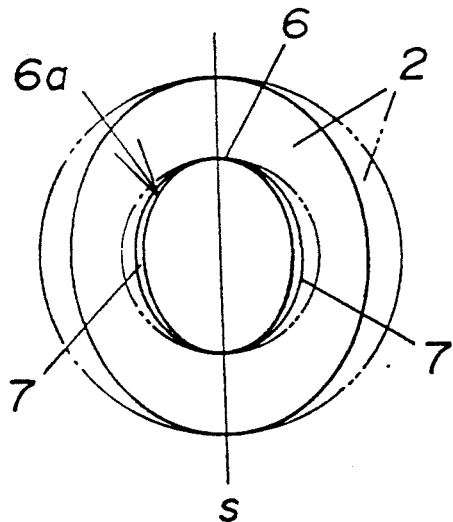
FIG. 5 D
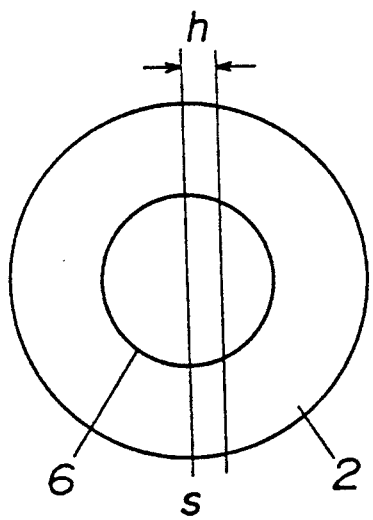
FIG. 5 E
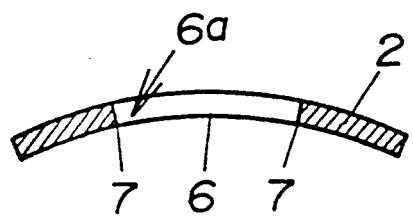
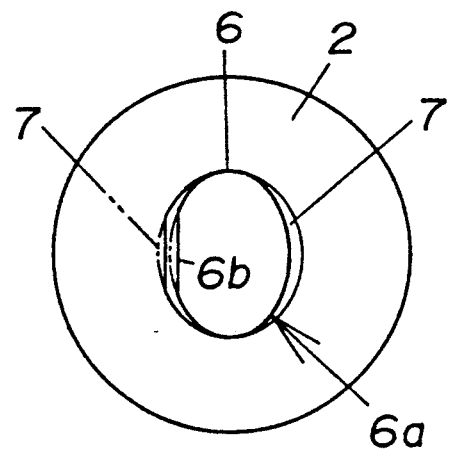
FIG. 5 F FIG. 9 A
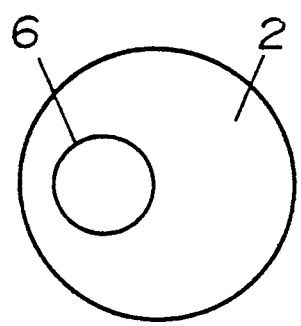
FIG. 9 B
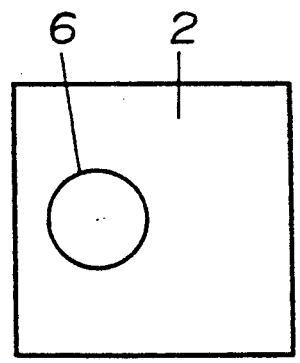
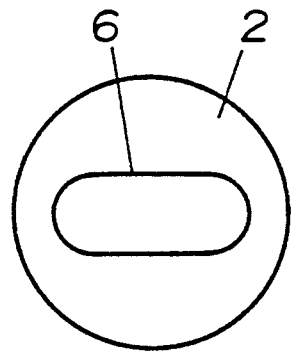
FIG. 9 C
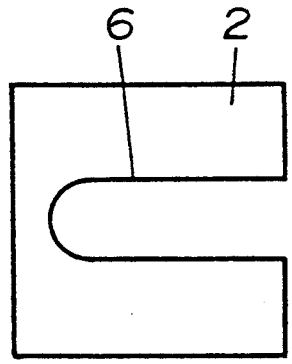
FIG. 9 D FIG. 15 A
FIG. 15 B
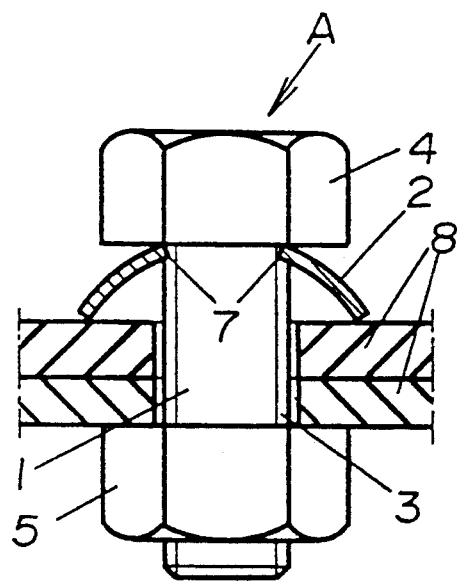
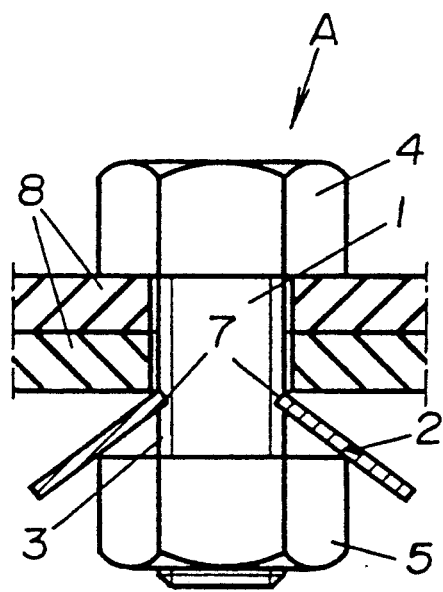

FIG. 17 A
Prior Art
FIG. 17 B
Prior Art
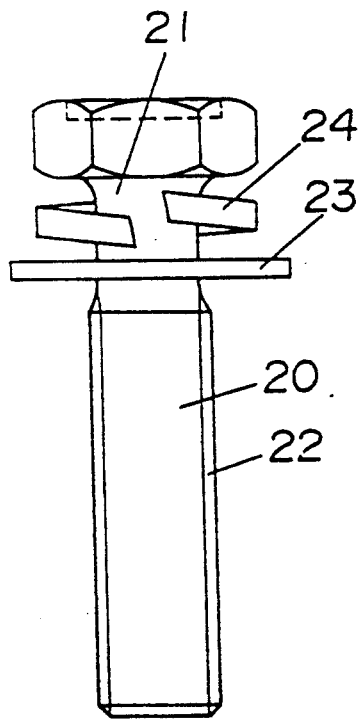
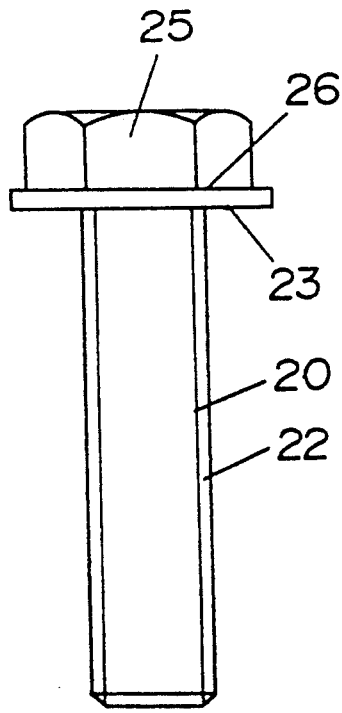

FASTENING MEMBER, FASTENING MACHINE ELEMENT SET, AND METHOD OF CONNECTING FASTENING MACHINE ELEMENT

BACKGROUND OF THE INVENTION

1. Field of the Invention

The present invention relates to a method of joining fastening members for use to assemble or connect articles.

2. Description of the Prior Art

Hitherto, articles have been assembled or connected by ordinarily using fasteners such as bolts, and a variety of washers have been used with the bolts in order to prevent looseness of the tightened bolt, realize a wide area contact, and reliably retain the bolt head if the bolt hole is too large.

In order to be easily transported or stored, or in order to improve the facility of the working operation, a washer of this type has been so arranged, as shown in FIG. 17A, that an underhead portion 21 of a bolt 20 is machined by rolling or the like to make its diameter to be smaller than that of a thread portion 22 so as to receive washers 23 or 24. As an alternative to this, another arrangement has been sometimes employed, in which a washer 23 is fixed by caulking to a seating surface 26 of a bolt head 25 so as to be integrated with a bolt.

However, in the aforesaid case shown in FIG. 17A, the rolling work must be additionally performed at the time of manufacturing the bolt 20, and therefore the cost of the product rises excessively. As a result, a problem arises in that a desire of supplying cheap products to the market cannot be achieved. What is worse is that whenever the combination of the washers 23 and 24 is changed, the machining jig must be changed and this changing work takes a too long time. In addition, the strength of the underneck portion 21 formed to have a small diameter becomes unsatisfactory, causing a problem in that fastening cannot be stably performed. Furthermore, since the thread portion 22 is omitted from the underneck portion 21, the aforesaid arrangement cannot be adapted to fasten a thin member.

In the case shown in FIG. 17B, the arrangement so made that the washer 23 is temporarily fixed to the bolt 20 will cause the member, which is the subject of the fastening work, to be damaged by burrs or the like left on the surface of the washer 23 when the bolt 20 is revolved, if the side of the washer 23 is adversely selected when it is temporarily fixed to the bolt 20.

In particular, the aforesaid structures involve a fact that the washer cannot be changed to another kind of washer at the time of the fastening work, that is, the washer cannot be removed from the shaft portion or the thread portion of the bolt, causing a necessity in that a required number of sets, each of which is composed of a bolt and a nut, are prepared depending upon the object or the portion in which they are used. Therefore, a problem arises in that the cost to perform the fastening work cannot be reduced and storage and the stock control cannot be easily performed. Furthermore, since the washer cannot be temporarily fixed to the shaft portion or the thread portion of the bolt, the washer will undesirably fall from the thread portion of the bolt if the nut is received by the bolt in a case where the bolt faces downwards. What is worse is that an operator must labor the task at the time of performing the fastening work in a portion into which the hand cannot be easily introduced or a portion at which the operator cannot take a comfortable position. As a result, a problem on a viewpoint of the working condition takes place.

SUMMARY OF THE INVENTION

To this end, an object of the present invention is to provide a fastening member, a machine element for fastening and a method of fastening the machine element for fastening which are so arranged that a through hole of a fastening member freely fastened to the shaft, the thread or the receiver portion of a thread member is formed into a narrow hole by warping, deforming, bending or twisting the fastening member so as to cause the thread portion of a male thread member to be fastened to fastening edges. Thus, the fastening member and a member to be installed and held by the fastening member can be easily temporarily fixed. When the male thread member is tightened, the narrow hole created by the warping or the bending work is restored to the original moderate through hole by the tightening force, so that free rotational state is realized. Therefore, the damage of the corresponding element due to rubbing can be prevented.

According to the present invention, the fastening member and the member to be installed can be temporarily fixed to the male thread member while necessitating a simple machining work in which the through hole of the fastening member is warped, deformed, bent, or twisted. Therefore, a satisfactory working facility and handling facility can be realized at the time of fastening articles.

Since the fastening member can be easily fastened to the male thread member by means of a screwing work, the type of the male thread member can be immediately changed if it must be changed in the field. Furthermore, the necessity of preparing a multiplicity of fastening member sets of the male thread members and the fastening members to meet the subject operation can be eliminated. Therefore, an advantage in terms of a cost reduction can be obtained and the storage and stock control can be easily performed because the space can be saved.

Moreover, an additional process for giving the male thread portion a means to support the fastening member can be omitted. Therefore, the defective connection due to the unsatisfactory strength caused from the additional work can be prevented. Furthermore, since the thread can be formed to the seating surface of the bolt head, a thin member can be reliably fastened.

In particular, the fastening member according to the present invention is so arranged that the warp, the deformation, bending and the twist can be gradually modified to a flat shape as the tightening of the male thread portion or the female thread portion proceeds. It leads to a fact that the narrow hole is expanded so as to be restored to the original hole, causing the fastening member to be freed with respect to the thread member. Therefore, the fastening member can be freely rotated and therefore, the surface of the member to be installed can be protected from damage due to rubbing at the time of the rotation of the thread member.

Other and further objects, features and advantages of the invention will be appear more fully from the following description.

BRIEF DESCRIPTION OF THE DRAWINGS

FIG. 5A is a perspective view which illustrates a state where the two sides of the through hole of the fastening member are warped;

FIG. 5B is a perspective view which illustrates a state where one of the two sides of the through hole is warped;

FIG. 5C is a plan view of the state shown in FIG. 5A;

FIG. 5D is a plan view which illustrates a state where warp is realized at a deviated position;

FIG. 5E is a cross sectional view of FIG. 5A;

FIG. 5F illustrates a state where a secondary narrow hole is formed;

FIGS. 9A-9D are plan views which illustrate examples of the structures shown in FIGS. 8A-8H;

FIGS. 15A-15B illustrate examples of the state of fastening of the fastening member shown in FIG. 1A;

FIGS. 17A-17B are front elevational views which illustrate conventional bolts and washers.

DESCRIPTION OF THE PREFERRED EMBODIMENTS

Figure 1:
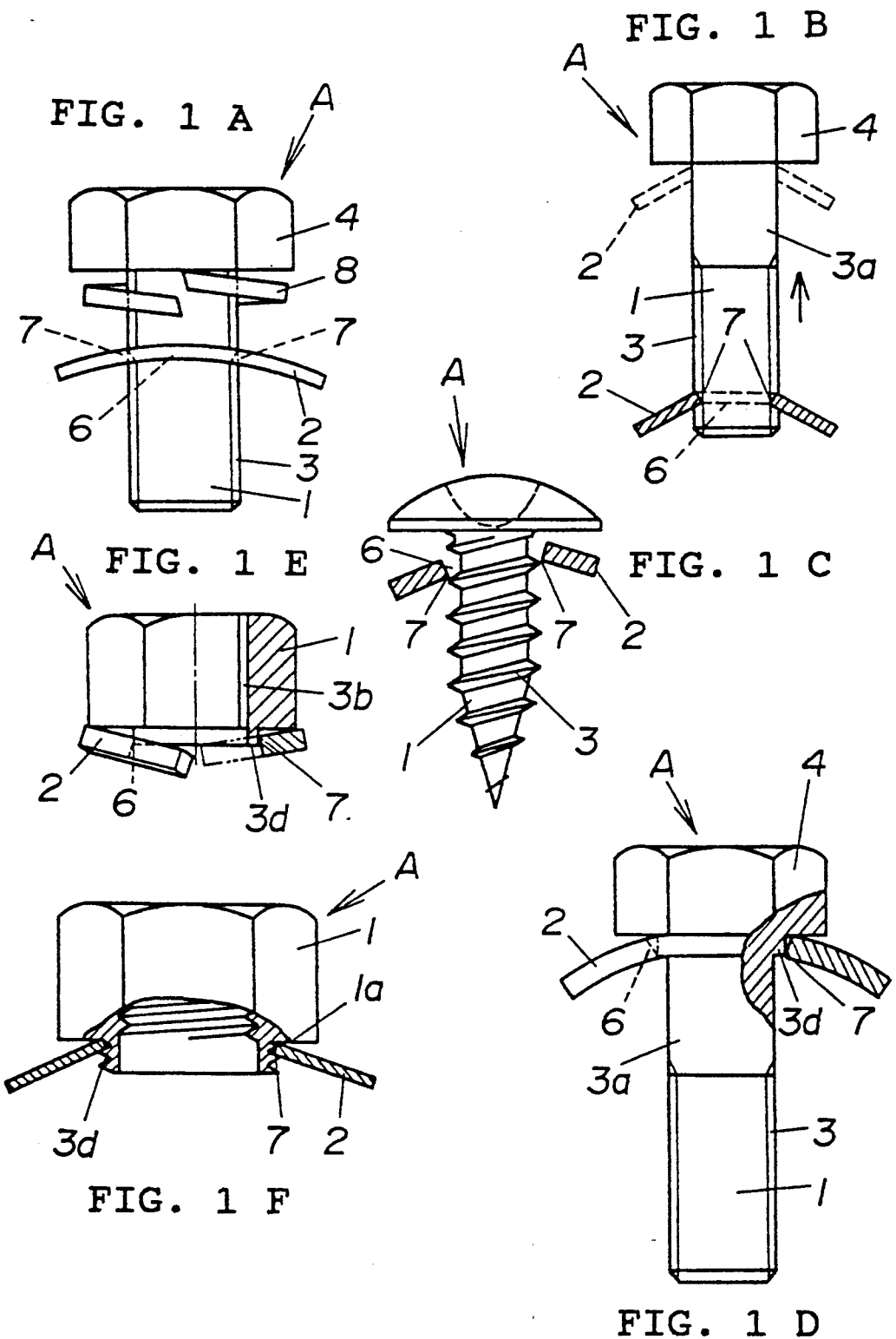
FIGS. 1A to 1D illustrate front view of machine elements of the invention where the thread members are male threads.
FIGS. 1E to 1F illustrate front views of machine elements of the invention where the thread members are female threads.

Preferred embodiments of a fastening member, a machine element set for fastening, and a method of connecting the machine element for fastening will now be described with reference to the drawing.

Referring to FIGS. 1 to 4 and FIGS. 10 to 15, symbol A represents a machine element set for fastening which is basically composed of a thread member 1 having a male or female thread formed on the surface thereof and a fastening member 2 so as to be utilized to assemble or connect articles. The aforesaid two members 1 and 2 (another machine element for fastening or a member to be installed is sometimes held between the two members) are combined to form a set at the time of the distribution or the storage.

In a case where the aforesaid thread member 1 is formed into the male thread, a thread portion 3 having a predetermined pitch is formed on the outer surface thereof. Incidentally, the present invention is not limited to the shape, type, thread pitch, or the position at which thee thread member 1 is used, and therefore, the following structures are included within the scope of the present invention: an ordinary bolt or screw having, as shown in FIGS. 1A to 1D, a head 4 at an end portion thereof and made of metal, a synthetic resin or another material; a special bolt or screw, a stud bolt, or an anchor bolt, or the like such as an individually formed thread member or a head-less thread member; and a male thread member 1 having, as shown in FIGS. 1B and 1D, a shaft 3a having no thread under the head 4.

In a case where the aforesaid thread member 1 is formed into the female thread, the present invention is not limited to the shape, type, thread pitch, or the position at which thee thread member 1 is used, and therefore, the following structures are included within the scope of the present invention: an ordinary nut arranged as shown in FIGS. 1E and 1F and made of metal, a synthetic resin, or another material; a specially machined female thread; and a special nut. As shown in FIG. 1E, a circular-arc receiver 3d having a diameter larger than that of a female thread 3b or widened toward the seating surface of the head 4 is formed continuously or intermittently and annularly with the seating surface 1a. As shown in FIG. 1F, a male member 3d integrally formed with the seating surface 1a of a nut 1 is used.

Figure 4:
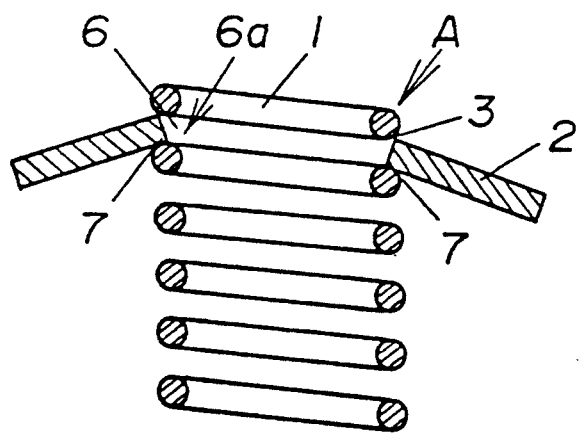
FIG. 4 is a cross sectional view which illustrates another embodiment of the fastening member.

As shown in FIG. 4, the male member 1 may be a coil spring having the thread portion 3 formed on the outer surface thereof.

Figure 6:
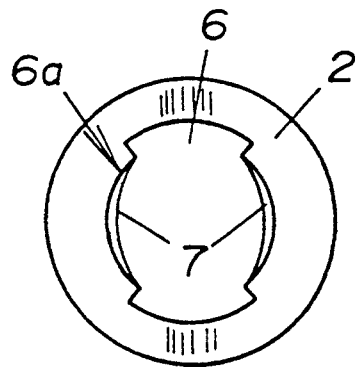
FIGS. 6A-6F illustrate various states of the structures shown in FIG. 5.
Figure 6:
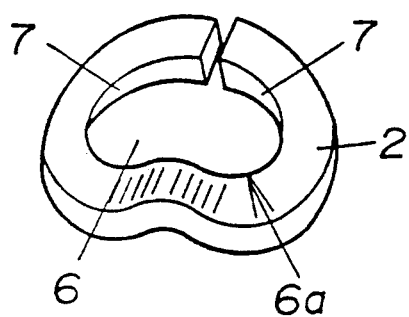
Figure 6:
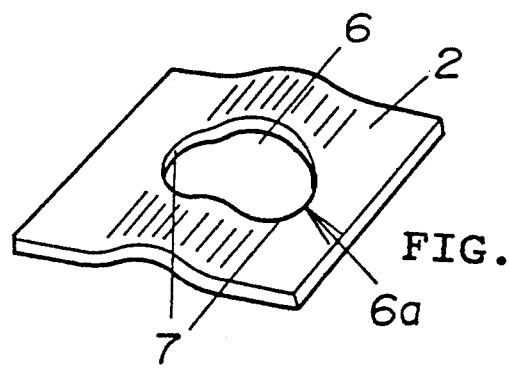
Figure 6:
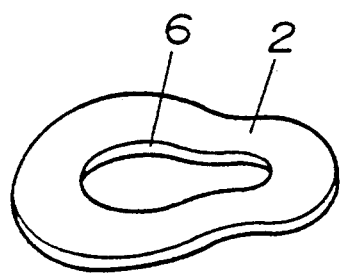
Figure 6:
Figure 10:
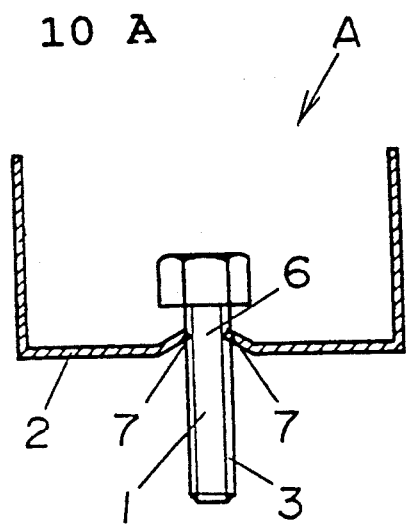
FIGS. 10A-10B are is a cross sectional views which illustrate another example of the structure shown in FIG. 1A.
Figure 10:
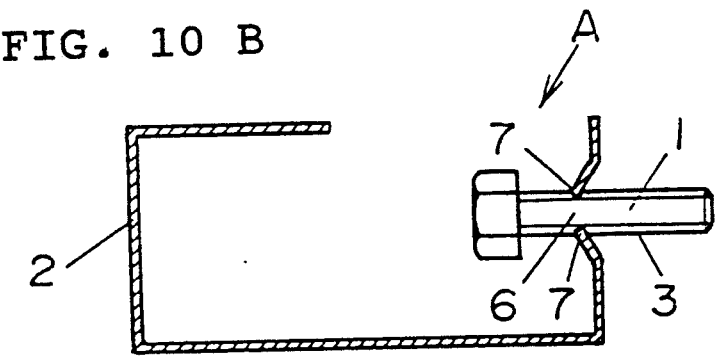
Figure 11:
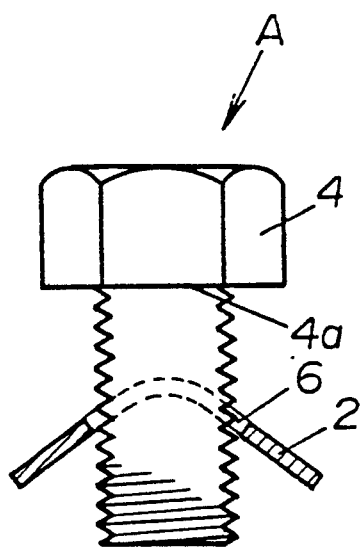
FIGS. 11A-11B are is a partial cross sectional front elevational views which illustrate various examples of the structures shown in FIG. 1A.
Figure 11:
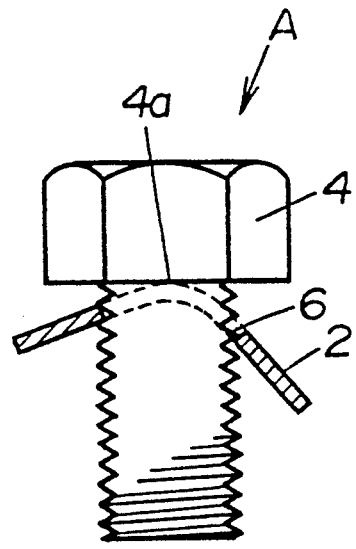
Figure 12:
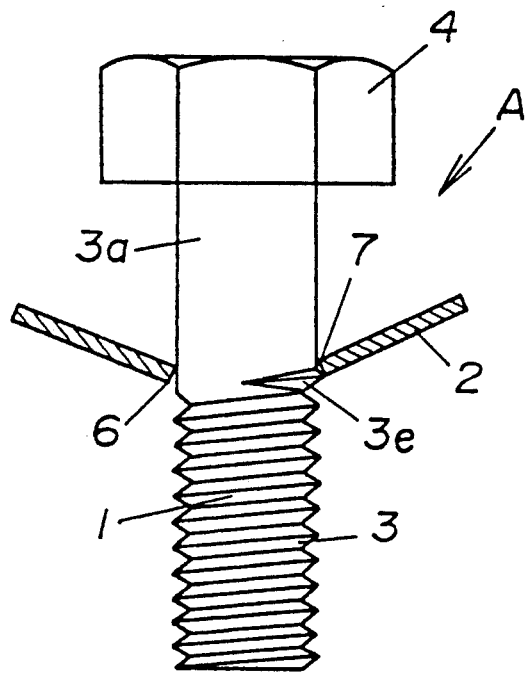
FIG. 12A is a partial cross sectional front elevational view of a different example.
FIG. 12B is a cross section view which illustrates the state of fastening of the fastening member taken along the shaft portion of the thread member.
Figure 12:
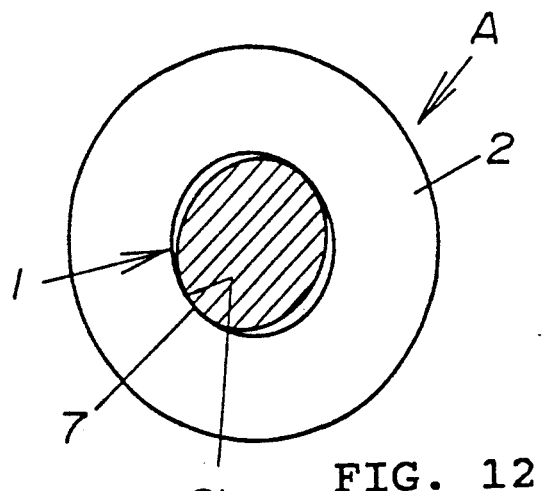

The aforesaid fastening member 2 is held between the male member 1 and a female member 5 such as a nut so that either side of the fastening member 2 comes in contact with the thread member 1 or the female member 5 when, for example, members 8 to be installed are tightly connected to each other by joining up the two members 1 and 5. The fastening member 2 may be any one of members for use in a variety of fields exemplified by: a member manufactured by shaping an ordinary (special types included) plain, spring or toothed washer as shown in FIGS. 5 and 6, a member manufactured by, as shown in FIG. 10, shaping a metal member, a component of an article which is arbitrarily used in a variety of industrial fields, a construction member for buildings or its auxiliary parts, a box-type case, a component of furniture, and a packing made of metal, nonferrous metal or synthetic resin.

Furthermore, the fastening member 2 has, in its arbitrarily position thereof, a through hole 6 having a diameter larger than the outer diameter of the shaft 3a and that of the thread portion 3 of the male member 1 or the outer diameter of the receiver 3d, the through hole 6 being formed into substantially circular or an ellipse, or the like.

The portion including the through hole 6 is warped, deformed or bent as shown in FIG. 5A, or twisted or deformed as shown in FIG. 6E, or allowed to wave as shown in FIG. 6B by an arbitrary pressing means (omitted from illustration) such as a press or a vice prior to the joining, of the fastening member A. The through hole 6 is deformed from a position designated by a phantom line to a position designated by a continuous line of FIG. 5C so that a narrow hole 6a is formed and fastening edges 7 are created on the narrowed sides of the circular arcs. The direction of the warp, bending, twisting or the deformation may be arbitrarily determined. The narrow hole 6a created in the fastening member 2 as described above is restored to the original through hole 6 by cancelling the warp, bending, twisting or the deformation, so that the thread fastening or joining of the fastening edges 7 to the thread portion 3 is cancelled.

The cancellation of the warp, bending, twisting or the deformation can be accomplished when the fastening member 2 is flattened by tightening the thread member 1 and the female member 5 or by rolling the fastening member 2 with hitting.

The narrow hole 6a is formed on a central line s of the through hole 6 formed in the fastening member 2 as shown in FIG. 5C, or the same is formed at a deviated position h deviated from the central line s by a predetermined quantity as shown in FIG. 5D. In the latter case, the fastening edges 7 can be fastened to the thread portion 3 due to the difference in the dead weight caused from the aforesaid deviation even if the narrow hole 6a has a diameter which is somewhat larger than the outer diameter of the male thread member 1, causing an effect to be obtained that the two members 1 and 2 cannot be easily separated from each other. Furthermore, the aforesaid warp, bending, twisting or the deformation may be given to either side of the two sides of the through hole 6 as shown in FIG. 5B.

In a case where the fastening member 2 is a spring washer as shown in FIG. 6A, it is sometimes formed into a coil-like shape so as to be formed into an ellipse at the time of forming the narrow hole 6a.

The fastening edge 7 is engaged to the ridge of the thread portion 3 of the male member 1 as shown in FIG. 2A, so that the fastening edge cannot be easily separated by the deadweight of the fastening member 2 or forcible tension. The aforesaid reliable engagement is accomplished at the two portions of the narrow hole 6a by causing the fastening edge 7 to engage with the thread portion 3 by means of the thread or by so freely fastening them to each other that the fastening edge 7 is slighted received.

Figure 16:
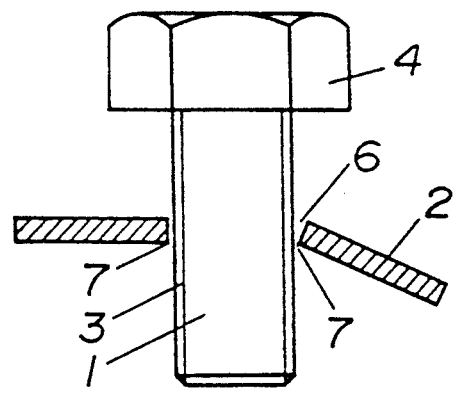
FIGS. 16A-B illustrate examples of the state of fastening of the fastening member shown in FIG. 1A.
Figure 16:
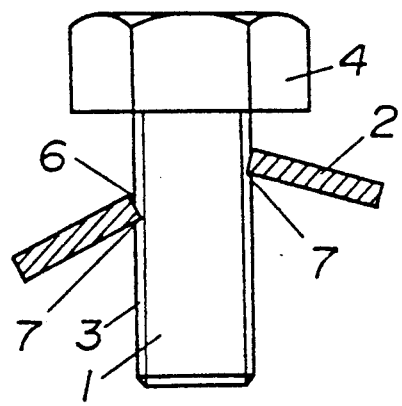

In the above-mentioned case where it is freely fastened, the fastening member 2 can be easily moved forwards/rearwards by the hand, that is the same can be translated on the thread portion 3, while the aforesaid movement is inhibited when the fastening edge 7 is allowed to engage with the thread portion 3 by laterally moving the fastening member 2 or diagonally positioning the same. When the inner surfaces of the fastening edges 7 of the through hole 6 and the surface of the thread portion 3 of the male member 1 are allowed to run parallel to each other as shown in FIG. 16A, the two members 1 and 2 can be freely movably held. When the male member 1 or the fastening member 2 is inclined afterward to make a predetermined angle as shown in FIG. 16B, the fastening edges 7 of the through hole 6 are allowed to engage with the thread portion 3, so that they are temporarily fixed to each other.

If the through hole 6 is formed while being deviated from the central position, the fastening edges 7 and the thread portion 3 can be naturally allowed to engage with each other due to the deviated gravity and therefore the fastening member 2 cannot easily fall. The fastening member 2 or the member 8 to be held between the fastening member 2 and the female thread member 1 is temporarily fixed.

Figure 7:
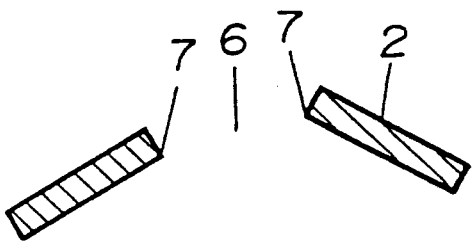
FIGS. 7A-7D are cross sectional views which illustrate states of warp, deformation, bending and twist of the fastening members shown in FIG. 5A-5F.
Figure 7:
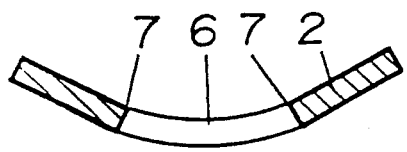
Figure 7:
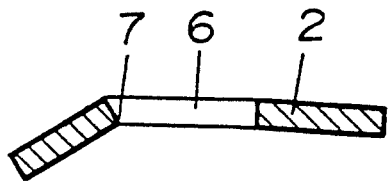
Figure 7:
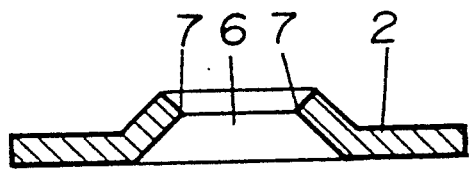

The aforesaid warp, bending, twisting or the deformation is so accomplished that the portion including the through hole 6 is formed into a circular-arc shape as shown in FIG. 5E, a shape widened downwards as shown in FIG. 7A (or a shape widened upwards), a shape widened downwards and as well as, given a level difference as shown in FIG. 7B, or a shape where either side is inclined upwards or downwards as shown in FIG. 7C. With each of the aforesaid arrangements, the bolt inserted into the narrow hole 6a is sometimes diagonally engaged to the fastening member 2. If the temporal fixing is performed simply, the necessity for the fastening edges 7 to be reliably allowed to engage with the thread portion 3 by means of the thread can be eliminated. Another arrangement may be employed which is so made that the portion surrounding the through hole 6 is raised.

Figure 8:
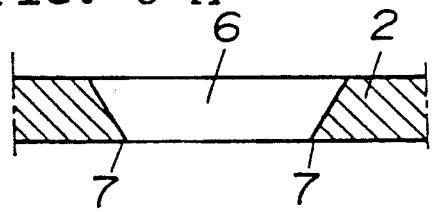
FIGS. 8A-8H are is a partial cross sectional views which illustrate examples of the fastening edges of the through holes of the fastening members.
Figure 8:
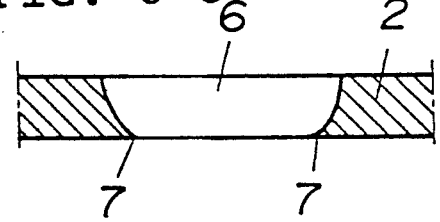
Figure 8:
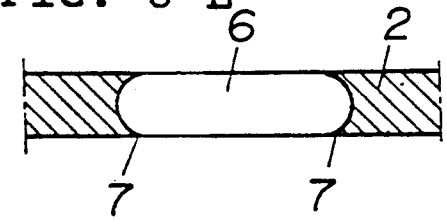
Figure 8:
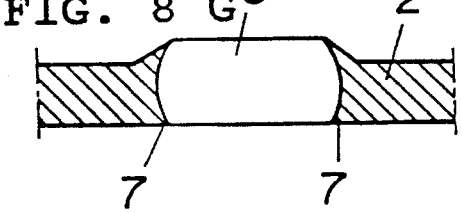
Figure 8:
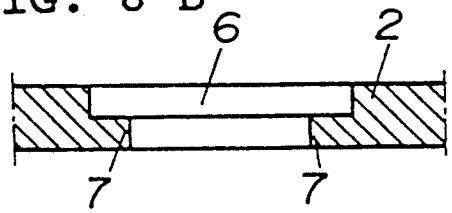
Figure 8:
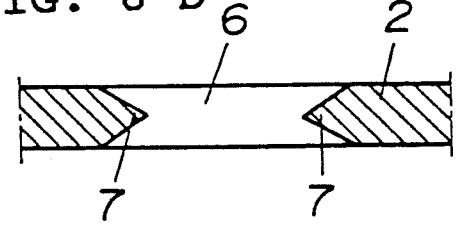
Figure 8:
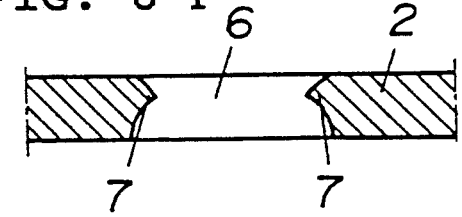
Figure 8:
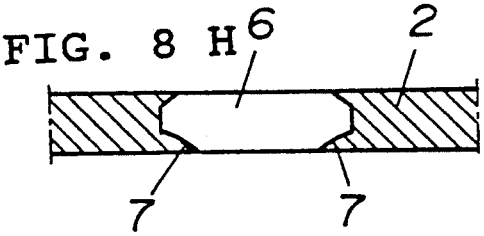

Furthermore, the inner surface of the through hole 6 may be so inclined as to be tapered off as shown in FIG. 8A, so formed into a stepped shape as shown in FIG. 8B, so formed to have a fin at either edge thereof, or a natural fin realized by the punching work such as a pressing work to be performed at the time of forming the through hole 6 as shown in FIG. 8C, or the inner surface is formed into an wedge shape as shown in FIG. 8D. Moreover, shapes shown in FIGS. 8E to 8H may be employed. As described above, any arbitrary shape may be employed if the fastening member 2 can be allowed to engage with the male thread member 1.

The through hole 6 formed in the fastening member 2 may be so formed as to be deviated with respect to the fastening member 2 as shown in FIGS. 9A and 9B, or formed into an elliptic shape as shown in FIG. 9C, or formed into a slit as shown in FIG. 9D.

The narrow hole 6a realized by warping, bending, twisting or deforming the through hole 6 formed in the fastening member 2 may be further formed into a secondary narrow hole 6b narrowed inwards at the position at which the narrow hole 6a is formed by pressing the side surface of the fastening member 2, the secondary narrow hole 6b (FIG. 5F) being formed at either side or the two sides of the fastening edge 7. In this case, the secondary narrow hole 6b will cause the thread fastening to the thread member 1 to be performed further reliably even if the warping, bending, twisting or the deforming work is performed moderately.

The aforesaid embodiment of the fastening member 2 is described about a case in which the set A is formed by combining the fastening member 2 and the thread member 1. The fastening member 2 may be solely distributed to the market or may be used with another thread member 1. For example, as shown in FIG. 3A, the member 8 to be installed can be easily temporarily fixed to a male thread member 1 projecting over another member by the fastening member 2 fastened to the thread portion 3 of the male member 1 by means of the thread. Furthermore, as shown in FIG. 3B, a washer serving as the fastening member 2 is, by the thread or fixing, temporarily fixed to the thread portion 3 of the bolt 1 downwards inserted into the member 8 to be installed as shown in FIG. 3B, and then a tightening nut serving as the female thread member 5 is received by the thread portion 3 by means of the thread, so that a time-taking and complicated labor of performing tightening while holding the nut together with the washer which can easily fall because no fixing means is provided can be omitted. As a result, the washer 2 can be installed significantly easily and therefore the fastening work can be performed easily.

The male thread member 1 may have a projection 3e which slightly projects beyond the shaft 3a or the thread portion 3 of the male thread member 1 (FIG. 12A). In this case, the narrow hole 6a of the fastening member 2 is so received by the male thread member 1 that the fastening edge 7 of the fastening member 2 gets over the projection 3e and then the fastening member 2 and the male thread member 1 are integrally fastened to each other.

The projection 3e can be formed by causing the rolling jig to work deeply by about the half of one thread at the final position of the thread 3 to be formed when the thread portion 3 is formed around the shaft 3a by rolling, causing about one thread corresponding to the aforesaid operation to rise. As a result, the protection 3e can be realized. However, the projection 3e may be formed by an individual process, or a portion formed naturally at the time of forming the aforesaid thread may be utilized.

In the aforesaid case, the fastening member 2 is so fastened that it is able to easily get over the projection 3e by slightly pushing the fastening member 2 or by rotating the same in the tightening direction when the fastening member 2 reaches the projection 3e after its through hole 6 has been received by the thread portion 3. The fastening member 2 received by the shaft portion 3a is able to freely move along the shaft portion 3a. Furthermore, even if the male thread member 1 is loosen, the fastening member 2 received by the thread portion 3 cannot be easily separated because the projection 3e is present.

The projection 3e of the shaft 3a can be omitted. Since the shaft 3a of the bolt 1 somewhat has elliptic deformation, the projection 3e realized by the aforesaid deformation is, as shown in FIG. 12B, so utilized that the fastening edge 7 formed in the narrow hole 6a of the through hole 6 of the fastening member 2 is aligned to the projection 3e. As a result, the two members 1 and 2 can be reliably fastened to each other.

Figure 3:
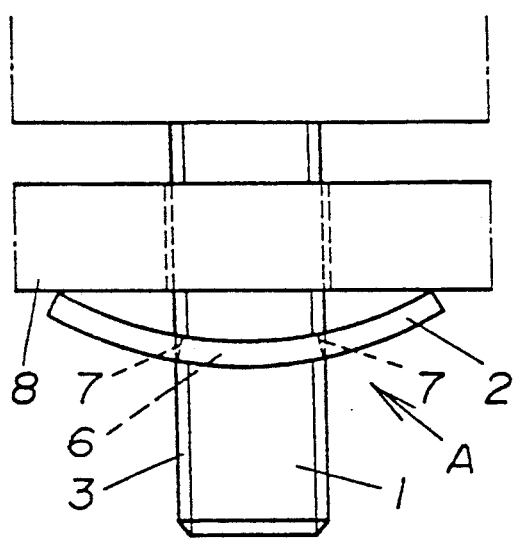
FIG. 3 is a front elevational view which illustrates a temporarily fixed state realized by the fastening member according to the present invention.
Figure 3:
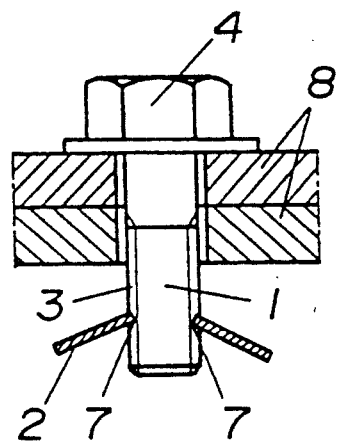
Figure 14:
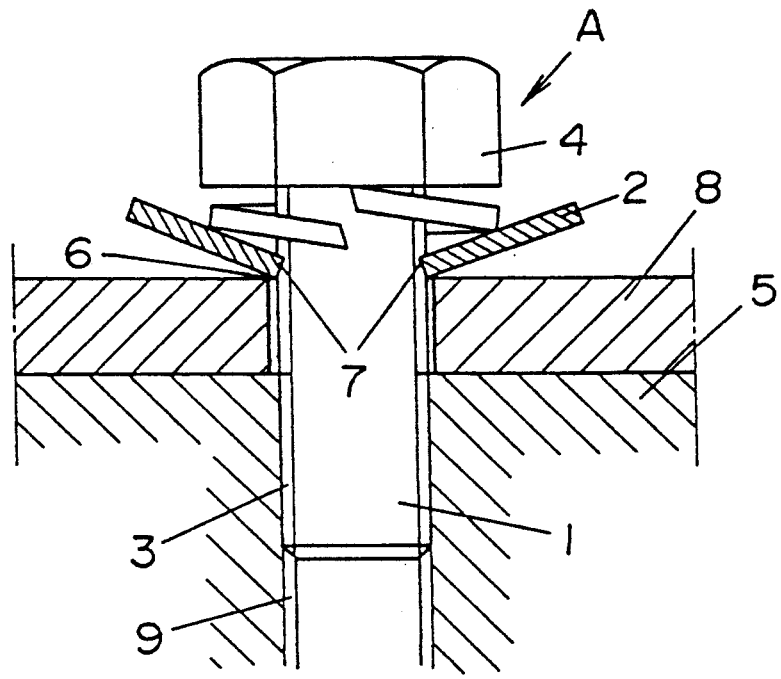
FIGS. 14A-14B illustrate examples of the state of fastening of fastening member shown in FIG. 1A.
Figure 14:
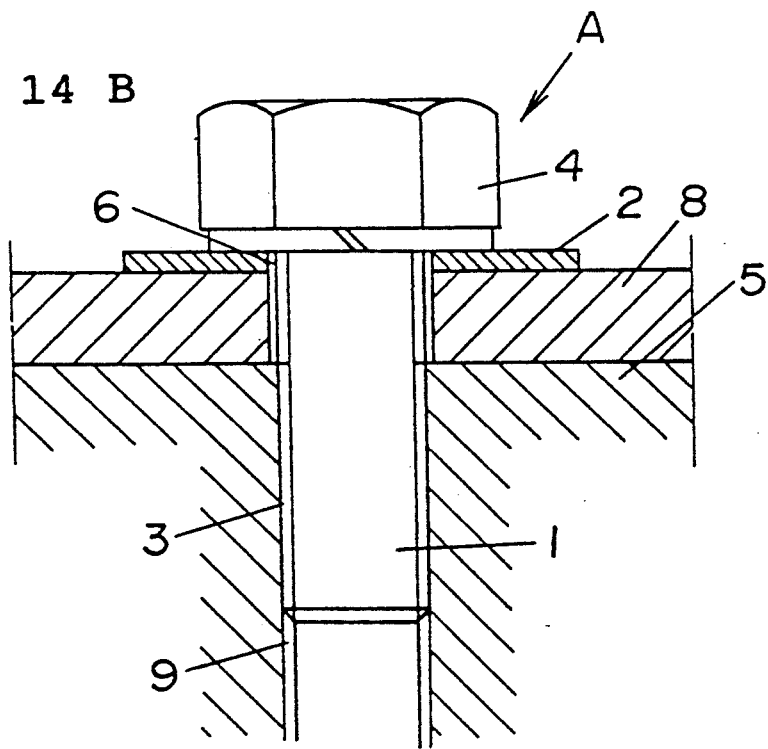

Referring to FIGS. 1A, 3 and 14, reference numeral 8 represents the member to be installed which is a spring washer to be used together with the fastening member 2 which is the plain washer as shown in FIG. 1A, or it may be a heat insulating material, or a protection member, or the like which is to be held between the seating surface and the fastening member 2.

Figure 13:
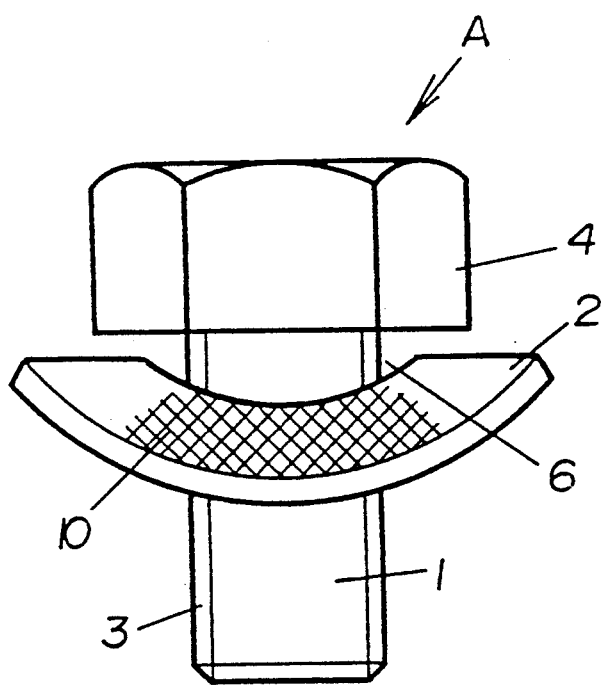
FIG. 13 is a front elevational view which illustrates another example of the fastening member shown in FIG. 1A.

Referring to FIG. 13, reference numeral 10 represents an index disposed in a partial or the entire surface of the fastening member 2, the index 10 showing the state of fastening when the male thread member 1 is received by the female member 5 by means of the thread to be discriminated from a distant position. If the index 10 is confirmed, the male thread member 1 and the female thread member are not tightened. If the index 10 cannot be seen because the fastening member 2 has become flattened after the tightening has been continued, the two members have been tightened. The index is formed by a coloring work by using a coating material or by bonding a film, or the surface of the fastening member 2 is disclosed by hologram or the same is detected by utilizing a bar code or the like.

The effect of temporarily fixing by using the machine element A for fastening can be sometimes exhibited, as shown in FIG. 15B, when the fastening member 2 is fastened to the thread portion 3 on the other side of the male thread member 1 inserted into fastening holes of the members 8 to be installed. In this case, the state of setting in which the members 1 and 2 are combined to each other can be maintained at the time of distributing the machine element A for fastening. Therefore, the two members 1 and 2 can be distributed to the market while being formed into a set. As a result, the working facility in the field can be significantly improved by temporarily fixing the fastening member 2 to the thread portion 3 in a case of an operation to be performed with driving anchors in which a large number of parts are used.

Then, the operation of the embodiment of the present invention will now be described with reference to the ordinary machine element A for fastening which is composed of the male thread 1 of a bolt having the head and the fastening member 2 which is a plain washer.

When the circular through hole 6 formed in the plain washer 2 is warped by a press, an elliptic narrow hole 6a is formed and therefore the fastening edges 7 to be allowed to engage with the thread portion 3 of the bolt 1 are formed on the narrow circular-arc side of the narrow hole 6a.

Figure 2:
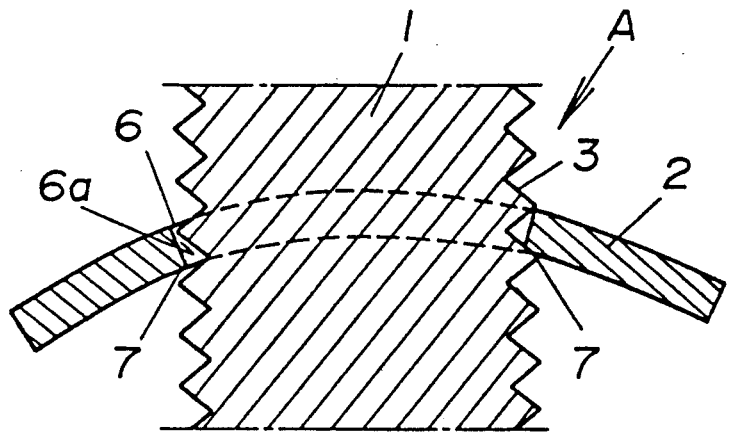
FIG. 2A illustrates an enlarged view where the fastening member is fastened to the male thread member.
FIG. 2B illustrates am enlarged view where the male thread member and the female thread member are tightened.
Figure 2:
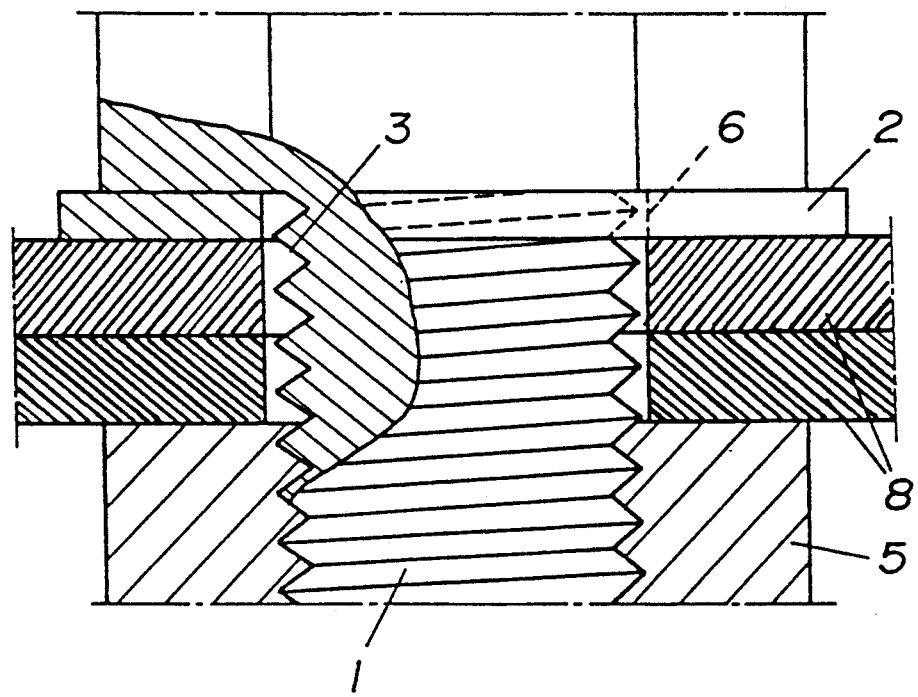

In the above-mentioned state, when the spring washer 8 is received by the thread portion 3 of the bolt 1 and then the plain washer 2 having the narrow hole 6 is received by the thread portion 3, the fastening edges 7 are allowed to engage with the thread of the thread portion 3 as shown in FIGS. 2 and 14A. As a result, they cannot be separated from each other by the dead weight of the plain washer 2 or ordinary tension.

As a result, the temporary fixing state where the bolt 1, the spring washer 8 and the plain washer 2 are integrally connected can be maintained. Therefore, the bolt and washer set can be easily distributed and change of the components of the set can be easily performed because the fastening edges 7 of the through hole 6 formed in the fastening member 2 and the thread portion 3 of the bolt 1 can be easily separated from each other.

When the bolt 1 is, via a member 8 such as a board to be installed, screwed into a base 5 having a female thread 9 as shown in FIG. 14A and the bolt 1 is tightened, the warped portion of the plain washer 2 is flattened and therefore the narrow hole 6a is gradually restored.

When the bolt 1 is further tightened to a state shown in FIG. 14A, the fixing of the fastening edges 7 with the thread portion 3 of the bolt 1 is cancelled and therefore the narrow hole 6a is restored to the circular through hole 6. As a result, the plain washer 2 is brought into contact with the surface of the member 8 to be installed in a hermetical manner and as well as the seating surface of the bolt 1 comes in closely contact with the surface of the plain washer.

If the plain washer has burrs on the lower surface thereof, the tightening is commenced at a state shown in FIG. 14A. Therefore, generation of damage due to rubbing can be prevented.

In a case where the fastening member 2 is made of the material for the spring steel, it also acts as a lock, resulting in a similar effect to that obtainable from the spring washer to be obtained.

Then, the operation of a second embodiment of the machine element A for fastening which is composed of the male thread member 1, which is a bolt having the head, and the fastening member 2, which is the plain washer, will now be described.

When the through hole 6 formed in the plain washer 2 is warped into a shape which expands downwards, the elliptic narrow hole 6a is formed and the fastening edges 7 are formed in the narrow circular-arc portion of the narrow hole 6a, the fastening edges 7 being moderately fastened to the thread portion 3 of the bolt 1.

In this state, the plain washer 2 having the narrow hole 6a is, as shown in FIG. 11A, so received by the thread portion 3 of the bolt 1 that the center of the narrow hole 6a aligns to the center line of the bolt 1, and then the fastening member 2 is so deviated to one side that the narrow hole 6a is positioned diagonally. As a result, a state as shown in FIG. 11B is realized in which the top portion of the fastening member 2 comes in contact with the seating surface 4a of the head 4 of the bolt 1 and as well as the fastening edges 7 of the narrow hole 6a are allowed to engage with the thread portion 3 of the bolt 1. Thus, the two members 1 and 2 can be connected to each other while being tightened.

In a case where the thread portion 3 is not formed in the underneck portion of the bolt 1, that is, in the shaft portion 3a as shown in FIG. 1B, the fastening member 2 is screwed by the female member 5 such as the nut or the thread portion 3 is slid by the hand. As a result, the fastening edges 7 of the fastening member 2 are passed through the thread portion 3 until they reach the no-thread portion of the shaft portion 3a under the neck, and the aforesaid fastening edges 7 act to perform the temporary fixing action in such a manner that the fastening member 2 comes in contact with the seating surface of the bolt 1. If the shaft portion 3a with no thread has a diameter smaller than that of the thread portion 3, it can be similarly fixed.

Furthermore, when the nut 5 is received by the thread portion 3 in a state where the fastening member 2 such as the plain washer is received by the bolt 1 inserted into the installation holes of the members 8 to be installed, the warped fastening member 2 so comes in contact with the outer surface of the member 8 to be installed and the seating surface of the head of the bolt 1 that the fastening member 2 is held between the member 8 and the bolt 1. As a result of the holding force, an additional effect can be obtained in that the undesired rotation of the bolt 1 together with the nut 5 while being integrated with the fastening member 2 can be prevented when the nut 5 is rotated.

In a case where the present invention is applied to the drive anchor, the previous fastening of the fastening member 2, which is the plain washer or the like, to the thread portion 3 will cause a dust protecting effect to be obtained because flying of the concrete chip or the like toward the operator at the time of the driving operation can be prevented by the plain washer 2.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A fastening member adapted to be placed over a shaft, said shaft having a thread portion therearound and a predetermined diameter, comprising:
    a body for forming the fastening member, said body being at least partly curved, and
    a hole formed in the body, said hole having a first diameter measured along a curvature of the body and a second diameter measured linearly through the hole, said first diameter being larger than the diameter of the shaft and said second diameter being less than said first diameter and substantially the same as the diameter of the shaft so that when the curved body is engaged with the shaft, the body is not disengaged from the shaft, and when the curved body is flattened by tightening the shaft, the first and second diameters become equal and the body is disengaged from the shaft to move freely around the shaft.

2. A fastening member according to claim 1, wherein said body includes fastening edges around portions of the hole where the second diameter is measured, said fastening edges engaging the thread portion of the shaft.

3. A fastening member according to claim 2, wherein said shaft includes a female thread inside thereof.

4. A fastening member according to claim 2, wherein said shaft is a male member with a head for constituting a bolt.

5. A fastening member according to claim 1, wherein said hole formed in the body is located at a position deviated from a center line of the body.

6. A fastening member according to claim 1, wherein said hole formed in the body has a secondary hole formed by pressing said fastening member.

7. A fastening member according to claim 1, wherein said body having the first diameter includes a bent portion in a middle portion of the body so that the second diameter is formed in the body.

8. A machine element set for fastening, comprising:
    a shaft having a thread portion around the shaft and a predetermined diameter, and
    a fastening member including a body for forming the fastening member, said body being at least partly curved; and a hole formed in the body, said hole having a first diameter measured along a curvature of the body and a second diameter measured linearly through the hole, said first diameter being larger than the diameter of the shaft and said second diameter being less than said first diameter and substantially the same as the diameter of the shaft so that when the curved body is engaged with the shaft, the body is not disengaged from the shaft, and when the curved body is flattened by tightening the shaft, the first and second diameters become equal and the body is disengaged from the shaft to move freely around the shaft.

9. A machine element according to claim 8, wherein said body includes fastening edges around portions of the hole where the second diameter is measured, said fastening edges engaging the thread portion of the shaft.

10. A machine element according to claim 9, wherein said shaft includes a female thread inside thereof.

11. A machine element according to claim 9, wherein said shaft is a male member with a head for constituting a bolt.

* * * * *